Figure 1:
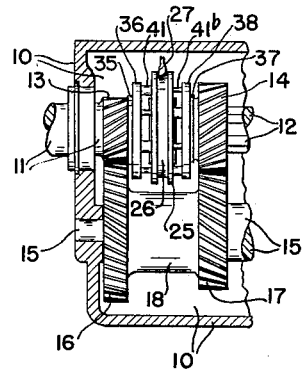

Oct. 30, 1951     H. A. SCHULTZE     2,573,613

SYNCHRONIZING POWER TRANSMITTING MECHANISM

Filed Sept. 27, 1947

INVENTOR.
HELMUTH A. SCHULTZE
BY *Theodore E. Simonton*
ATTORNEY

Patented Oct. 30, 1951

2,573,613

UNITED STATES PATENT OFFICE 2,573,613

SYNCHRONIZING POWER TRANSMITTING MECHANISM

Helmuth A. Schultze, Syracuse, N. Y., assignor to New Process Gear Corporation, Syracuse, N. Y., a corporation of Delaware Application September 27, 1947, Serial No. 776,450

5 Claims. (Cl. 192—53)

The invention relates to an improved power transmitting mechanism of the type adapted for use in a motor vehicle drive system in which positive clutches are employed to selectively connect torque transmitting members, and in which synchronizing means are employed to prevent clashing of the positive clutches.

The general purpose of the invention is to provide a power transmitting mechanism having simple, compact, and efficient synchronizing means to prevent clashing of the elements of a positive clutch that would ordinarily occur if the clutch elements were engaged while rotating at substantially different speeds. Such clashing is objectionable in itself because of noise and may damage the clutch.

A further object of the invention is to provide in a motor vehicle transmission, improved means for synchronizing the speeds of the driving and driven elements of a positive clutch and for blocking engagement of the positive clutch elements until synchronization is effected.

The invention is particularly applicable to that type of motor vehicle transmission having a pair of positive clutches selectively engageable for driving the vehicle at different speeds and having a pair of friction clutches, each associated with one of the positive clutches, to facilitate non-clashing engagement of the positive clutches. In transmissions of this type, each friction clutch functions during shift of its associated positive clutch, to effect synchronization of the speeds of rotation of the driving and driven elements of its positive clutch prior to their engagement, and each friction clutch also commonly energizes an associated blocker means to releasably block engagement of its positive clutch while its elements are rotating out of synchronism.

A further object of the invention is to provide a transmission of the type just described having means for placing the driving and driven elements of each of the friction clutches under relatively light blocker energizing pressure engagement to control the operation of its blocker means as aforesaid, and to effect, during shift of each positive clutch, an increased and relatively heavy pressure engagement of the associated friction clutch elements to force synchronization of the positive clutch elements prior to their engagement.

A further object of the invention is the provision of an improved construction and arrangement of two pairs of such positive and friction clutches by which the driving and driven elements of each friction clutch are constantly maintained in blocker energizing engagement, and neither friction clutch is disengaged during synchronizing operation of the other friction clutch.

A further object of the invention is the provision of an improved construction and arrangement of the positive and friction clutches whereby one element of each friction clutch is provided with means cooperating with a corresponding element of the other friction clutch to normally maintain said friction clutches in relatively light blocker-energizing pressure engagement, while permitting heavy synchronizing pressure engagement of either desired one of the friction clutches without de-energizing the blocking means of the other friction clutch, whereby each friction clutch is always conditioned to block even a fast non-synchronous shift of its positive clutch and to insure positive clutching without clashing.

More specifically, the invention has for its objects the provision of a synchronizing mechanism in which each of two axially spaced friction clutches has one element in the form of a ring having an internal conical friction surface; which ring is provided with one or more lateral projections that abut a side face of the corresponding ring of the other friction clutch for mutually positioning their internal friction surfaces in engagement with external conical friction surfaces of their complementary clutch elements; in which each of said projections has blocker means and a lost-motion rotative driving connection with an axially and oppositely shiftable positive clutch element to permit automatic limited relative rotary movement between each of said rings and said positive clutch element between positions in which the blocker means respectively blocks and permits a selected clutching shift of said positive clutch element; in which one of said friction clutches is continuously biased for light blocker-energizing engagement of its elements and in which the biasing force is transmitted to the other friction clutch by means of the aforesaid projections to correspondingly continuously bias the other clutch; and in which neither of the friction clutches is deenergized by the synchronizing operation of the other, and each friction clutch is always conditioned to cause its associated blocker means to block a relatively fast asynchronous clutching actuation of its associated positive clutch and to insure non-clashing positive clutching.

Figure 2:
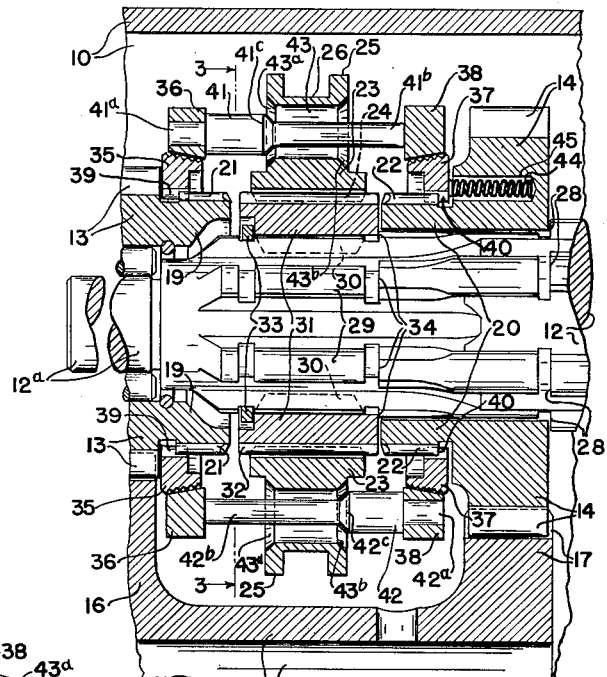
Figure 3:
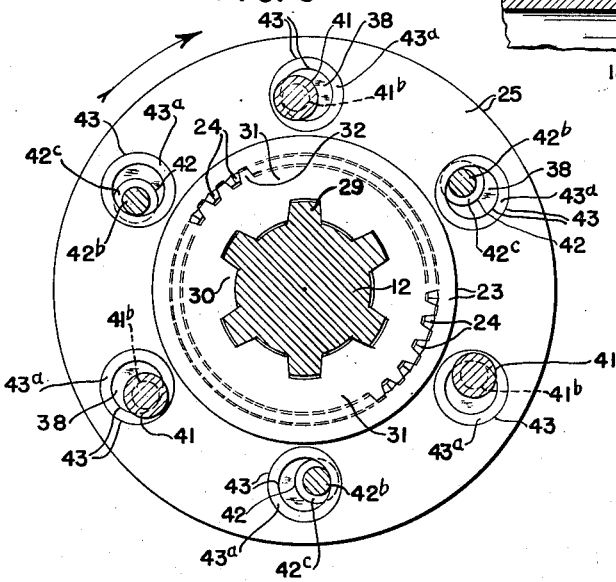

Other objects and advantages of the invention will be apparent from the following description of the preferred embodiment of the invention illustrated in the accompanying drawing, in which:

Figure 1 is a fragmentary view of a motor vehicle transmission of conventional form embodying the invention, the view being partly in elevation and partly in vertical section taken approximately axially of the input, output and counter shafts, synchronizing means embodying the present invention being provided for the direct and second speed drives, and the several parts of the synchronizing means being shown in neutral position;

Figure 2 is an enlarged fragmentary sectional view taken through the upper half of the structure shown in Figure 1 and in the plane in which lie the axes of the input, output and counter shafts of the transmission; and Figure 3 is an enlarged detail sectional view taken on the line 3—3 of Figure 2, and showing certain of the parts positioned as in Figures 1 and 2.

The invention is shown in conjunction with a known motor vehicle transmission of the constantly meshed gear type, although it will be understood that the improvements may be applied to other transmission arrangements where it is desired to first synchronize and then positively connect rotating members.

The known transmission includes a mechanism enclosing and supporting casing 10, into one end of which there projects one end of a driving or power input shaft 11 which is adapted to be driven by the vehicle engine, preferably through the medium of the usual releasable main clutch, the engine and clutch not being shown, as both may be of known form. The driven or power output shaft 12, which is constantly connected with the driving ground wheels of the vehicle and is coaxial with shaft 11, has one end thereof extending into the opposite end of casing 10 and, as is common in the art, has a reduced terminal portion 12a journaled in antifriction bearings in an axial recess formed in the main driving gear 13.

Gear 13 is formed on, or otherwise fixed to, that end of shaft 11 which extends into casing 10. Gear 13 is constantly connected with the second speed driving gear 14 through the medium of the speed reducing gear cluster mounted in the casing 10 on the countershaft 15 supported in said casing The gear cluster comprises the gears 16 and 17 having a common hub 18 which is mounted on countershaft 15 to constantly maintain the gear 16 meshed with gear 13 and to constantly maintain the gear 17 meshed with gear 14. Gear 14 is coaxial with gear 13 and is loose on output shaft 12 as usual. Additional speed drives, including the usual low and reverse speed drives are contemplated, but showing thereof is omitted as synchronizing means are not ordinarily employed therefor.

The adjacent ends of the coaxial gears 13 and 14 are formed respectively with reversely arranged and coaxial driving clutch elements 19 and 20 of annular or ring-like form provided around their respective peripheries with external clutch teeth 21 and 22 which extend parallel to the common axes of said clutch elements and are similar in form to spur gear teeth.

A sleeve-like driven clutch element 23 provided with internal clutch teeth 24 is supported for opposite axial shifting from a neutral position in which it is disengaged from both of the externally toothed clutch elements 19 and 20 into clutching engagement with either desired one of the clutch elements. The clutch sleeve 23 is thus, as is usual, the common driven element for two positive clutches The clutch sleeve 23 is constantly positively connected to rotate in unison with the output shaft 12, and is axially slidable along said shaft 12, the connection means for said clutch sleeve and shaft being hereinafter more fully described.

The teeth 24 of clutch sleeve 23 also are of spur gear tooth form, extend parallel to the axis of the sleeve, and are slidable into the tooth spaces between the teeth 21 and 22 of clutch elements 19 and 20. The elements 19 and 20 are of like diameters and their teeth are of like sizes and number. The ends of teeth 24 and the adjacent ends of teeth 21 and 22 are preferably chamfered as usual to facilitate engagement of the two positive clutches formed by the three clutch elements 19, 20, and 23. The clutch sleeve 23 is formed medially of its ends with a circumferential rib 25 provided with a circumferential groove 26 in which is engaged the usual clutch shifter fork a part of which is shown at 27.

It will be obvious from the foregoing that, when clutch sleeve 23 is clutched with clutch element 19, the input shaft 11 is positively connected with the output shaft 12 for direct or high speed driving of the output shaft, and that, when the clutch sleeve 23 is clutched with clutch element 20, the input shaft 11 is positively connected with the output shaft 12 for driving the output shaft at a lower speed or second speed ratio through the train of gears 13, 16, 17, and 14.

The coaxial shafts 11 and 12 are axially separable as usual for assembly of the second speed gear 14 and the synchronizing and blocker means. The improvements illustrated in the drawing and incorporated with the aforesaid known features of the transmission will be now described.

The output shaft 12 is splined as shown, and has successive reduced portions permitting assembly and positioning of the various parts, as is customary. The second speed gear 14 is loosely mounted for rotation on the first reduced portion, and is held against axial movement in one direction by the interrupted shoulder 28 formed by the reduction of the splines. The next reduced portion of the output shaft 12 has splines 29 engaging the internal splines 30 of a hub 31. The hub 31 has external teeth 32 engaging the internal clutch teeth 24 of the clutch sleeve 23 and permitting axial sliding movement of the clutch sleeve as above described. The clutch sleeve 23 and the output shaft 12 are thus constantly positively connected for rotation in unison. The hub 31 is held against axial movement in one direction by the retaining ring 33, which is releasably seated in an annular groove in the shaft 12, and, in the opposite direction, is held by the shoulder 34 between the aforesaid two reduced shaft portions. The hub 31, in turn, limits the opposite axial movement of the gear 14. The hub 31 extends substantially from one to the other of the clutch elements 19 and 20 and is of the same major diameter as said elements.

The means for synchronizing the speeds of rotation of the positive or jaw clutch elements selectively connecting the input and output shafts for direct or high speed drive and for second speed drive, and the means for blocking a quick asynchronous clutch shift of either positive clutch into engagement, will be now described.

A friction clutch of the cone type is associated with the main driving gear 13 fixed to the input shaft 11, and a second friction clutch of the cone type is associated with the second speed gear 14 which is loosely mounted on the output shaft 12. These two friction clutches are of identical form but their clutch elements are reversely arranged.

The friction clutch associated with gear 13 comprises an inner ring 35 having a conical external friction surface and an outer ring 36 having a complementary conical internal friction surface. The friction clutch associated with gear 14 similarly comprises an inner ring 37 having a conical external friction surface and an outer ring 38 having a complementary conical internal friction surface. The two friction clutches are of like size and form except that the conical friction surfaces of one clutch slope oppositely to those of the other clutch, the friction surfaces all sloping inward toward the intermediate positive clutch sleeve 23 which is axially slidable between the friction clutches in opposite directions from its neutral position shown in the drawing.

The friction clutch ring 35 is detachably and positively engaged with the positive clutch element 19 to rotate therewith, said ring 35 having internal clutch teeth 39 which are constantly slidably engaged between the clutch teeth 21 of the positive clutch element 19 in the assembled condition of the mechanism. Element 35 may thus be slid axially on and off of element 19 in assembling and disassembling the mechanism, but is constantly positively connected with element 19 and consequently with gear 13 and input shaft 11 for rotation in unison therewith. Preferably also the friction clutch ring 35, as shown, is constructed to afford a slight radial clearance permitting a slight play or floating thereof relatively to element 19 transversely of the axis of element 19 while interlocked with element 19. The friction clutch ring 37 is similarly detachably and floatingly but positively engaged with the positive clutch element 20 to rotate therewith, the element 37 having internal clutch teeth 40 constantly slidably engaged between the clutch teeth 22 of element 20.

The friction clutch ring 36 is supported by its companion clutch ring 35 to float therewith transversely of the axis of shafts 11 and 12, said clutch rings being in light friction-driving, blocker-energizing engagement while the axially slidable clutch sleeve 23 is in neutral position. The friction clutch ring 38 is similarly supported by and engaged with its companion clutch ring 37, the construction being such that the elements forming each friction clutch may float in the described manner relatively to those forming the other friction clutch. The construction also is such that, as hereinafter more fully described, the companion elements of either friction clutch may be pressed at will into strong friction-driving engagement to synchronize the elements of the associated positive clutch, without adversely affecting the aforesaid light blocker-energizing engagement of the companion elements of the other friction clutch.

The outer ring 36 of the friction clutch associated with the main driving gear 13 is provided with a set of round pins or fingers 41, which extend laterally from said element parallel to the axis of the latter, and abut the inner side face of the outer ring 38 of the friction clutch associated with the second speed gear 14. Each pin 41 has a reduced end portion 41$^a$ fitting in one of a plurality of transverse bores in ring 36. These bores are equally spaced around the axis of ring 36 and are equidistant from said axis. Preferably, the pin ends 41$^a$ have a driven fit in said bores, but they may be rotative therein, if desired. At their opposite ends, the pins 41 each have a reduced portion 41$^b$, and each pin has a conical cam shoulder 41$^c$ extending therearound at the juncture of its main body portion and reduced portion 41$^b$.

The outer ring 38 of the friction clutch associated with the second speed gear 14 is provided with a like set of pins 42 having reduced end portions 42$^a$ and 42$^b$ and a conical cam shoulder 42$^c$, said pins being similarly mounted on ring 38, and having their outer ends abutting the inner side face of ring 36. In the construction shown, ring 36 is provided with three pins 41 and ring 38 is provided with three pins 42. The pins thus bridge the space between the flat inner side faces of the rings 36 and 38. Because these side faces present a relatively large area, there is no problem of alignment such as would exist if pins of such small end area were arranged to abut one against the other.

A set of cylindrical apertures or bores 43 extend through the circumferential rib 25 of the axially shiftable positive clutch sleeve 23. Six such bores are provided in the construction shown, one for each pin 41 and one for each pin 42. The bores for each set of pins have their axes spaced to correspond to the circumferential and radial spacing of the axes of the pins of that set. Each bore 43 has its opposite ends flared outward to provide conical cam surfaces 43$^a$ complementary to cam surfaces 41$^c$ of pins 41 and conical cam surfaces 43$^b$ complementary to conical cam surfaces 42$^c$ of pins 42.

The reduced pin portions 41$^b$ and 42$^b$ are of like length, their length being preferably such that, when the clutch sleeve 23 is in the neutral position shown in Figure 2, the cam surfaces 41$^c$, 43$^a$, and also the cam surfaces 42$^c$ and 43$^b$, are slightly out of contact.

It is desirable that the retaining ring 33, hub 31 and shoulder 28 be arranged to permit a slight axial play of the gear 14 of preferably about .007″ on shaft 12. This play and the spacing of the friction clutches by the pins should be such that gear 14 cannot engage and thrust axially against the assemblage of pin-spaced friction clutches, with possible resultant breakage of the pins, and cause heavy pressure engagement of the clutches when such engagement is not desired.

The relative diameters of the bores and pins are such that when the reduced portions 41$^b$ and 42$^b$ of the pins 41 and 42 are located within the bores, a substantial lost-motion is afforded between the pins and sleeve 23, and that when the main body portions of either set of pins are located within the bores, a slight lost-motion is still afforded between that set of pins and sleeve 23. The friction clutch rings therefore float at all times, even though each set of pins affords at all times a rotative driving connection, with some lost-motion therein, between its friction clutch ring and the axially shiftable positive clutch sleeve 23.

The several shafts, gears and positive clutch elements are formed of suitable metal, such as steel. Since the two ring elements of each friction clutch are detachable, they may be formed of material or materials best adapting them for efficient functioning. One of the ring elements of each friction clutch is preferably steel and the other bronze. In the construction shown, the inner ring is made of bronze and the outer ring of steel. Each of the inner bronze rings 35 and 37 preferably has its friction surface helically grooved or threaded, as indicated in Figure 2, and as more fully shown and described in Fishburn Patent No. 2,333,165, issued November 2, 1943, to facilitate operation of the friction clutches. However, if desired, the outer rings 36 and 38 could be formed of bronze and the inner rings of steel, in which case the outer rings would have their friction surfaces grooved or threaded.

The pins 41 and 42 are formed of suitable metal, preferably the same as that of the rings to which said pins are attached. The two sets of pins space the outer friction clutch rings 36 and 38 a fixed minimum distance, with the flat outer ends of the pins mounted on each ring abutting the flat inner face of the other ring. The spacings of the pins and of the bores 43 around the axis of elements 36, 38, and 23, are such that the two sets of pins cannot collide.

Axial separation of the inner rings 35 and 37 is limited by the adjacent flat inner sides of the gears 13 and 14. The parts could be accurately constructed in such manner that the rings 36 and 38 at their fixed minimum spacing would seat in light blocker-energizing pressure engagement with rings 35 and 37, with the latter abutting respectively the gears 13 and 14. However, in the interest of greater manufacturing tolerances and insured efficient operation, the friction clutches are preferably continuously biased for light pressure friction-slip driving engagement. For this purpose, in the preferred construction shown, the ring 37 is continuously biased lightly toward ring 35 by one or more, preferably three, light expansion springs 44 spaced equally around the axis of the ring. The springs 44 project from axially extending sockets 45 in gear 14 and abut the flat outer face of ring 37. The springs 44 lightly press the rings 37 and 38 together and, through the medium of the pins 41 and 42, the biasing force of the springs is transmitted to ring 36 to lightly press the rings 35 and 36 together and lightly press ring 35 against the gear 13.

The pins 41 and 42 serve also to coact with the axially shiftable positive clutch sleeve 23 to block an asynchronous shift of the sleeve, and further coact with said sleeve and one or the other of the friction clutches to bring the desired pair of positive clutch elements into synchronism prior to their engagement. The cooperative pairs of cam surfaces 41c—43a and 42c—43b, function both to block asynchronous shift of clutch sleeve 23 and to transmit pressure from the sleeve to the proper one of the outer friction clutch rings 36, 38, to press it into relatively heavy pressure driving engagement with its companion inner ring to bring the positive clutch elements selected for engagement into synchronism before said positive clutch elements contact at their ends.

The operation of the above described mechanism will be obvious to those skilled in the art. The shafts 11 and 12 and clutch sleeve 23 rotate in the direction indicated by the arrow in Figure 3, and the clutch sleeve 23 and output shaft 12 always rotate together. Whenever a synchronized shift is made, the rotating sleeve and the pins 41 and 42 instantly assume the relative positions shown in Figure 3, as soon as sleeve 23 slides into the neutral position; and the sleeve 23 begins to drive the outer rings 36, 38, of the friction clutches through the pins. Figure 3 thus shows the positions of the parts when the vehicle is moving forward, a synchronized shift is being made, and the transmission is in neutral. Of course, the pins 41 and 42 will occupy different positions within the bores 43 under other operating conditions. If the sleeve 23 is then shifted toward either of the positive clutch elements 19, 20, the cam surfaces 41c—43a or 42c—43b will instantly engage and balk or block further shifting of the sleeve before it can contact that one of the elements 19, 20, toward which it is being moved. This blocking action causes transmission of pressure from sleeve 23 to the outer ring of the friction clutch associated with the positive clutch element 19 or 20 with which the sleeve is to be clutched, and presses said outer ring into a relatively heavy pressure driving engagement with its inner ring for quickly bringing the associated positive clutch element into synchronism with the rotating clutch sleeve 23. When synchronization has thus been effected, the clutch teeth 24 on the sleeve 23 may be aligned with the clutch teeth 21 or 22, but, more frequently, this will not be so. In either case, continued axial thrust on the sleeve 23 will cause it to slide into mesh with the synchronized clutch element 19 or 20. Where the positive clutch teeth are not in alignment, the axial thrust, exerted on the chamfered clutch teeth ends, will cam them into alignment. This may occur by the pins rotating slightly with respect to the bores 43, but is more likely to occur by a momentary breaking or slipping of the friction clutch.

When the clutch sleeve 23 is thrust axially toward either selected one of the positive clutch elements 19, 20, one of the sets of coactive blocker cam surfaces 41c—43a or 42c—43b abut and transmit thrust from the sleeve to press the elements of the proper friction clutch into heavy pressure engagement with the result that the selected positive clutch element is synchronized with the sleeve with great rapidity. This synchronization enables the engaged cam surfaces to be easily forced past each other by continued thrust on sleeve 23 so that the operator may thrust said sleeve into clutching engagement with the selected one of the positive clutch elements 19, 20. As soon as the engaged cam surfaces cross each other and the main body portions of the pins of the selected friction clutch enter their associated apertures 43 in clutch sleeve 23, the heavy pressure engagement of the elements of the selected friction clutch is relieved and both friction clutches will again be only in light-pressure blocker-energizing engagement until another clutching shift is made.

It will be observed that each of the four friction clutch elements and the axially shiftable positive clutch element are readily detachable upon axial separation of the input and output shafts; that each of the four friction elements may be made of different material than its associated torque transmitting structure; that each friction clutch is free for limited universal floating relative to its associated torque transmitting structure; that each friction clutch is constantly in light friction slip driving engagement for actuation of its associated blocker means; that the blocker means associated with each friction clutch, when engaged by the axially shiftable positive clutch element, presses its friction clutch into relatively heavy driving engagement to quickly synchronize the positive clutch elements which are to be placed in clutching engagement; that neither friction clutch is released at any time; that each friction clutch and its pins or projections coact with the other friction clutch to properly support and position the latter in the assemblage; and that the friction clutches and their pins form a knockdown, small assembly of light mass but in which the friction surfaces are nevertheless of large diameter for effective torque transmission.

Although I have thus described my invention in the best form of which I am aware, it will be evident to those skilled in this art that changes and modifications could be made without departing from the spirit of my invention. I desire to be limited, therefore, only by the scope of the appended claims.

I claim:

1. A synchronizing power transmitting mechanism comprising, in combination, two positive clutch elements coaxially supported for relative rotation with a fixed minimum axial spacing, an axially shiftable positive clutch element coaxial with said first two positive clutch elements and supported for relative rotation with respect thereto in a neutral declutched position therebetween and for opposite axial clutching shifts to clutch it selectively to either of said first two positive clutch elements, two conical friction clutch rings each connected to a different one of said first two positive clutch elements to rotate constantly as a unit therewith, two spaced conical friction clutch rings each complementary to and supported by a different one of said first two friction clutch rings, a plurality of rigid spacer fingers carried by each of said spaced complementary rings in staggered relationship to the fingers of and projecting toward the other of said rings, each of said fingers being secured to one only of said spaced complementary rings and having its free end adapted to abut the body of the other ring to determine the minimum axial spacing between said rings, said spaced complementary rings being free for limited relative axial movement beyond such minimum spacing, said shiftable positive clutch element having axial passage larger than said spacer fingers and through which said fingers project, the walls of said passages cooperating with said fingers to provide independent lost-motion rotary driving connections between said shiftable clutch element and each of said spaced complementary rings, whereby said complementary rings have independent limited relative rotation with respect to said shiftable positive clutch element, and rigid blocker means carried by said spacer fingers and rotative therewith relative to said shiftable positive clutch element into and out of position to block the clutching shifts of said element, each of said blocker means in its blocking position being engageable by said shiftable positive clutch element for thrusting the associated complementary friction clutch ring into tight pressure engagement with its mating friction clutch ring.

2. A synchronizing power transmitting mechanism comprising, in combination, two positive clutch elements coaxially supported for relative rotation with a fixed minimum axial spacing, an axially shiftable positive clutch element coaxial with said first two positive clutch elements and supported for relative rotation with respect thereto in a neutral declutched position therebetween and for opposite axial clutching shifts to clutch it selectively to either of said first two positive clutch elements, two conical friction clutch rings each connected to a different one of said first two positive clutch elements to rotate constantly as a unit therewith and to have limited axial floating movements with respect thereto, two spaced conical friction clutch rings each complementary to and supported by a different one of said first two friction clutch rings to float therewith, a plurality of rigid spacer fingers carried by each of said spaced complementary rings in staggered relationship to the fingers of and projecting toward the other of said rings, each of said fingers being secured to one only of said spaced complementary rings and having its free end adapted to abut the body of the other ring to determine the minimum axial spacing between said rings, said spaced complementary rings being free for limited relative axial movement beyond such minimum spacing, said shiftable positive clutch element having axial passages larger than said spacer fingers and through which said fingers project, the walls of said passages cooperating with said fingers to provide independent lost-motion rotary driving connections between said shiftable clutch element and each of said spaced complementary rings, whereby said complementary rings have independent limited relative rotation with respect to said shiftable positive clutch element, and rigid blocker means carried by said spacer fingers and rotative therewith relative to said shiftable positive clutch element into and out of position to block the clutching shifts of said element, each of said blocker means in its blocking position being engageable by said shiftable positive clutch element for thrusting the associated complementary friction clutch ring into tight pressure engagement with its mating friction clutch ring.

3. A synchronizing power transmitting mechanism according to claim 2, wherein the spacer fingers are round pins parallel to and spaced around the axis of the friction clutch ring by which they are carried, the blocker means are conical shoulders on said pins, said pins being reduced in diameter from said shoulders to their free ends, and the passages through the shiftable positive clutch element are cylindrical holes provided with conical counter-bores at each end.

4. A synchronizing power transmitting mechanism according to claim 1, wherein the spacer fingers are round pins parallel to and spaced around the axis of the friction clutch ring by which they are carried, the blocker means are conical shoulders on said pins, said pins being reduced in diameter from said shoulders to their free ends, and the passages through the shiftable positive clutch element are cylindrical holes provided with conical counter-bores at each end.

5. A synchronizing power transmitting mechanism according to claim 1, wherein at least one of said two friction clutch rings connected to and rotating with said two positive clutch elements has limited axial floating movements with respect to its supporting positive clutch element.

HELMUTH A. SCHULTZE.

REFERENCES CITED

The following references are of record in the file of this patent:

UNITED STATES PATENTS

| Number | Name | Date |
|---|---|---|
| Re. 22,265 | White | Feb. 9, 1943 |
| 1,786,980 | Carling | Dec. 30, 1930 |
| 2,101,826 | Thompson | Dec. 7, 1939 |
| 2,333,165 | Fishburn | Nov. 2, 1943 |
| 2,350,411 | Nabstedt | June 6, 1944 |
| 2,369,842 | Neracher et al. | Feb. 20, 1945 |
| 2,384,439 | Carnagua et al. | Sept. 11, 1945 |